April 23, 1935. A. BARÉNYI 1,998,568
PHOTOGRAPHIC CAMERA
Filed Oct. 21, 1933
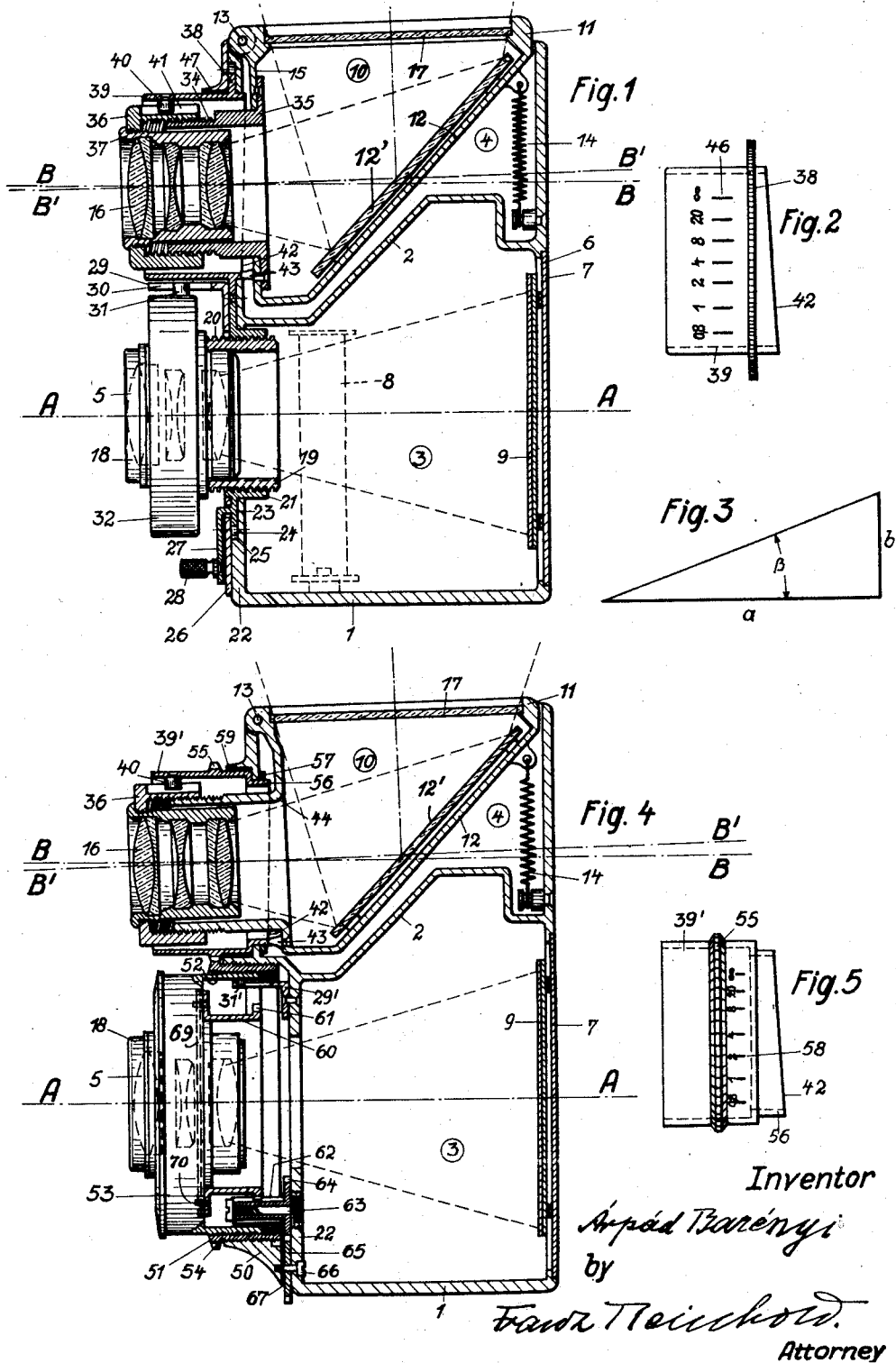
Inventor
Árpád Barényi
by
Attorney Patented Apr. 23, 1935

1,998,568

UNITED STATES PATENT OFFICE 1,998,568

PHOTOGRAPHIC CAMERA

Árpád Barényi, Berlin-Lichterfelde, Germany, assignor to Voigtländer & Sohn Aktiengesellschaft, Brunswick, Germany, a joint-stock company of Germany Application October 21, 1933, Serial No. 694,625
In Germany November 9, 1932

13 Claims. (Cl. 95—44)

My invention relates to improvements in photographic cameras, and more particularly in cameras of the type comprising a finder disposed laterally of or above the exposure lens and adapted to be inclined with its axis relatively to the optical axis of the exposure lens according to the distance of the subject to be photographed, so that parallax is avoided and the same portion of the scene is reproduced in the finder and on the sensitized surface. One of the objects of the improvements is to provide a camera of this type in which the mechanism for setting the finder in position is connected with the exposure lens so that the finder is automatically inclined when the exposure lens is shifted inwardly or outwardly.

Another object of the improvements is to provide a camera in which the finder lens is at the same time shifted in the direction of the optical axis and inclined with the said axis relatively to the optical axis of the exposure lens when the said exposure lens is shifted inwardly or outwarly.

Other objects of the improvements will appear from the following description of the invention.

For the purpose of explaining the invention two examples embodying the same have been shown in the accompanying drawing, in which the same reference characters have been used in all the views to indicate corresponding parts.

In said drawing

Fig. 1 is a sectional elevation showing the camera,

Fig. 2 is a plan view showing a ring for axially shifting the finder lens and inclining the finder, Fig. 3 shows a diagram, Fig. 4 is a sectional elevation showing a modification of the camera, and Fig. 5 is a plan view showing the ring for axially shifting the finder lens and inclining the finder.

In the example shown in Figs. 1 to 3 of the drawing the camera comprises a body or case 1 formed with a partition 2 dividing the same into an exposure chamber 3 and a finder chamber 4. The exposure chamber is provided with a lens or lens system 5, and it has an opening 6 at its rear which is normally closed by a lid 7. In the example shown in Fig. 1 the camera is provided with film spools 8, and the film 9 is passed across the opening 6, as is known in the art.

In the finder chamber 4 a finder 10 is located which comprises a casing 11 having a bottom 12 inclined at an angle of 45° and having a mirror 12' mounted thereon. The casing 11 is hinged to the top part of the front wall 22 at 13, and it is acted upon by a spring 14 tending to swing the same and to advance its front wall 15 forwardly. The camera case is open above to afford observation of the finder. The finder comprises a lens or a system of lenses 16 and a focusing screen 17. Preferably the lenses or lens systems 5 and 16 and their focal lengths are alike so that equal images are produced on the sensitized surface 9 and the screen 17. The front wall of the case is orificed above and below, to afford passage of light to and through the finder lens and the picture-taking lens.

The carrier 18 of the picture-taking or exposure lens 5 comprises a tube 19 which is formed with external screw-threads 20 of large pitch, and which is in engagement with an internally screw-threaded ring 21 mounted in the front wall 22, and encircling the lower orifice in the front wall of the case. The ring 21 is provided with a flange 23 formed with gear teeth 24 and embedded in a recess 25 made in the front wall 22, a plate 26 being fixed to the front wall for holding the flange 23 in position. The flange 23 is made integral with an arm 27 carrying a finger piece 28. From the plate 26 an arm 29 projects forwardly which is formed with a slot 30 engaged by a pin 31 secured to the shutter housing 32, the said pin and slot preventing rotary movement of the shutter housing, the lens 5 and its mounting. When the ring 21 is turned by means of the finger piece 28 the tubular member 19 and the lens 5 carried thereby are shifted inwardly or outwardly for focusing.

The front wall 15 of the finder casing 11 is formed with a hole and in it is set a lens structure. This includes a tubular member 35 rigidly secured to the finder casing which projects through the upper orifice in the front wall of the camera case and is formed at its outer end with external screw-threads 34 of large pitch. On the tubular member 35 an internally screwthreaded ring 36 is mounted to which the barrel 37 supporting the lens or lens system 16 is secured. Between the front wall 22 and the top part of the plate 26 a gear wheel 38 is rotatably mounted which is in mesh with the gear wheel 23, 24 and which is made integral with a ring 39. To the said ring a pin 40 is secured which loosely engages a longitudinal slot 41 in the wall of the ring 36, the engagement being such as to permit axial movement of the ring and pivotal movement of the finder 11 on its pivot 13. Therefore, when the gear wheel 38 is turned such rotary movement is transmitted to the ring 36, and the ring is shifted outwardly or inwardly by virtue of its screw-thread engagement with the tubular member 35. The stationary pin 40 has sufficient clearance in the groove 41 to permit rotary movement of the ring 36 with the finder casing 10 in inclined position.

By reason of the gear wheels 23, 24 and 38 the lenses 5 and 16 are shifted outwardly and inwardly in unison, and the numbers of the teeth of the said gear wheels and the pitches of the screw-threads 20 and 34 are such that whenever the picture has been focused in the finder system also the exposure system is in focusing position. Thus, when the lenses or lens systems 5 and 16 are alike, the gear wheels 23, 24 and 38 have equal numbers of teeth, and the pitches of the screw-threads 20 and 34 are alike, but they are of opposite turning, because the rings 21 and 36 rotate in opposite directions.

At its inner end the ring 39 is formed with a cam face 42 which is in engagement with a pin 43 secured to the front wall of the casing 11, the object of the said cam face and pin being to incline the finder 10 when the finder lens is shifted inwardly or outwardly, and the shape of the cam face is such that whenever the lenses 5 and 16 are shifted inwardly or outwardly according to the distance of the subject to be photographed, their optical axes intersect in the plane of the said subject, so that exactly the same part of the scene appears on the focusing screen 17 and the sensitized surface 9. The ring 39 with the cam face is shown in Fig. 2. As is shown in the said figure the ring carries scale marks 46 cooperating with a pointer 47 made on a relatively fixed part such as the plate 26, the said scale marks and pointer indicating the axial adjustment of the lens 16 and the distance of the subject to be photographed.

The pitch of the cam face 42 is such that the optical axis of the finder lens is inclined relatively to the optical axis of the exposure lens at a certain angle $\beta$ when the exposure lens has been set into position corresponding to a distance $a$ of the subject to be photographed. In Fig. 3 the distance between the optical axes has been indicated $b$. The relation of the said values follows from the following equation $$\tan g\ \beta = \frac{b}{a}$$

If both lenses are set to the infinite the optical axes of the lenses are parallel, and if a subject is to be photographed which is nearer the camera both lenses are uniformly adjusted in the direction of the optical axes, and simultaneously the finder casing and the optical axis of the finder lens are inclined according to the said distance of the subject. In Fig. 1 I have shown the optical axes A—A and B—B of the exposure and finder lenses directed to a subject located in the infinite and the optical axis B'—B' of the finder lens directed to a subject located near the camera and inclined relatively to the optical axis of the exposure lens.

In the modification shown in Figs. 4 and 5 the case 1, the chambers 3, 4 and the finder 10 have the same construction as the corresponding parts described with reference to Figs. 1 to 3, and the same letters of reference have been used to indicate corresponding parts. However, the screw-threaded tubular members for shifting the exposure lens and its carrier in the direction of the optical axis are constructed in a different way.

The front wall 22 of the case 1 is formed with an internally screw-threaded tubular extension 50 in which an externally and internally screw-threaded ring 51 is mounted, and within the said ring an externally screw-threaded tubular extension 52 of the shutter casing 53 is mounted. A slotted arm 29' fixed to the front wall 22 is in engagement with a pin 31' carried by the extension 52. The ring 51 is formed at its front end with gear teeth 54 meshing with gear teeth 55 formed on a tubular member 39' rotatably mounted in a hole of the front wall 22. As shown in Fig. 4, the tubular member 39' is formed at its inner end with a reduced portion 56 carrying an annular nut 57, the reduced portion 56 and the nut 57 holding the tubular member 39' in position on the front wall of the case while permitting rotary movement thereof. By means of the tubular member 39' rotary movement is imparted to the ring 36 for shifting the finder lens inwardly or outwardly as has been described above.

For shifting the lenses 5 and 16 inwardly or outwardly for focusing the scene on the sensitized surface 9 and the focusing screen 17 the ring 51 is rotated, for example by means of the hand of the operator engaging the gear teeth 54. Thereby the ring is shifted inwardly or outwardly within the tubular extension 50 and simultaneously the shutter casing 53 is shifted in the same direction because its rotary movement is prevented by the arms 29'. The external screw-threads of the ring 51 have a comparatively small pitch, so that the axial displacement of the ring within the limits of the rotary movement needed for setting the lens 5 in position is small, and the teeth 54 and 55 do not get out of engagement with each other.

Also in the construction shown in Fig. 4 the mechanism for shifting the lenses 5 and 16 is constructed so that the subject is always focused simultaneously on the sensitized surface 9 and the screen 17. The lens systems 5 and 16 are alike, and the diameters of the tubular member 39' and the ring 51 are different. Accordingly the pitch of the screw-threads of the parts 44, 36 is small as compared to the pitch of the screw-threads of the ring 51, the dimensions being such that by the rotary movement of the ring 51 equal axial displacements are imparted to both lenses.

By the rotary movement of the tubular member 39' the finder 10 is turned about its pivotal axis 13 through the intermediary of the cam 42, as has been described with reference to Fig. 1. The tubular member 39' is provided with scale marks 58 cooperating with a pointer 59, as has been described with reference to Fig. 1.

The iris diaphragm 69 is adapted to be set by means of a ring 60 which is rotatably mounted on the carrier of the exposure lens and connected with the laminations of the diaphragm by pins 70. The ring 60 is provided at its inner end with gear teeth 61 which are in engagement with a comparatively long pinion 62 rotatably mounted on a pin 63 fixed to the front wall 22 and made integral with a gear wheel 64. The gear wheel 64 is in mesh with a gear wheel 65 rotatably mounted on a bolt 66 and located in a slit 67 made in the tubular extension 50.

I claim:

1. A photographic camera, comprising a case; an exposure lens and its carrier, a finder rockingly mounted on said case for preventing parallax, a rotary member disposed coaxially of said exposure lens and its carrier and adapted to shift said exposure lens in the direction of the optical axis, a ring rotatably mounted on said finder and adapted when rotated to shift the finder lens in the direction of the optical axis, a tubular member around said ring and yieldingly connected therewith for imparting rotary movement thereto, said tubular member being rotatably mounted on said case, a cam intermediate said tubular member and finder adapted upon rotation of said tubular member to rock said finder in a direction for preventing parallax, and interengaging gear wheels provided respectively on said tubular member and on said rotary member.

2. A photographic camera, comprising a case, an exposure lens and its carrier, a rotary member mounted on said case concentrically of said exposure lens and adapted to shift said exposure lens in the direction of the optical axis, a finder rockingly mounted on said case for preventing parallax, a ring rotatably mounted on said finder concentrically thereof and adapted when rotated to shift said finder lens in the direction of the optical axis, a tubular member around said ring mounted on said case, said ring and tubular member being in pin and slot engagement with each other for transmitting rotary movement from the tubular member to the ring, a cam intermediate said tubular member and finder for rocking the finder, and gear teeth provided respectively on said tubular member and on said rotary member.

3. A photographic camera, comprising a case, an exposure lens and its mounting, said mounting comprising interengaging screw-threaded tubular members one connected with the lens and the other rotatably mounted on said case and formed with gear teeth and means for preventing rotary movement of said tubular member connected with the lens and permitting axial progression thereof, a finder and its casing comprising a finder lens and rockingly mounted on said case for preventing parallax, interengaging screw-threaded tubular members one connected with the carrier of said finder lens and the other fixed to said casing, a tube rotatable on said case and loosely engaging said tubular member connected with the carrier of the finder lens for imparting rotary movement thereto and permitting axial progression thereof, a cam intermediate said tube and finder casing for rocking said casing, and gear wheels intermediate said tube and said tubular member rotatably mounted on the case, said exposure and finder lenses having equal focal lengths, said gear wheels having equal numbers of teeth, and said screw-threads for shifting the exposure and finder lenses having equal pitches.

4. A photographic camera, comprising a case, an exposure lens and its mounting, said mounting comprising interengaging screw-threaded tubular members one connected with the lens and the other rotatably mounted on said case and formed with gear teeth and means for preventing rotary movement of said tubular member connected with the lens and permitting axial progression thereof, a finder and its casing comprising a finder lens and rockingly mounted on said case for preventing parallax, interengaging screw-threaded tubular members one connected with the carrier of said finder lens and the other fixed to said casing, a tube rotatable on said case and loosely engaging said tubular member connected with the carrier of the finder lens for imparting rotary movement thereto and permitting axial progression thereof, a cam intermediate said tube and finder casing for rocking said casing, and gear wheels intermediate said tube and said tubular member rotatably mounted on the case, said exposure and finder lenses having equal focal lengths, said gear wheels having different numbers of teeth, and said screw-threads for shifting the exposure and finder lenses having different pitches, the relation between the gear ratio and the pitches being such that the exposure and finder lenses have equal axial progression.

5. A photographic camera, comprising a case, an exposure lens and its shutter casing, a rotary ring disposed on said case concentrically of said casing, said shutter casing and ring being formed with interengaging screw-threads, a finder rockingly mounted on said case and comprising a finder lens, its carrier, and a rotary ring for shifting said finder lens and its carrier in the direction of the optical axis, a tubular member rotatably mounted on said case and connected with said ring for rotating the same, and interengaging gear teeth provided respectively on said ring disposed concentrically of said shutter casing and on said tubular member.

6. A photographic camera, comprising a case, a tubular member projecting from said case, an internally screw-threaded tubular member projected forwardly from said case, an internally and externally screw-threaded ring mounted in said tubular member, an exposure lens and its mounting formed with an externally screw-threaded tubular member engaging in the internal screw-threads of said ring, and means for preventing rotary movement of said tubular member and permitting axial progression thereof.

7. A photographic camera, comprising a case, an exposure lens and a finder lens and their carriers, rotary members around said carriers and connected therewith for axial progression of said carriers, interengaging gear wheels connected with said rotary members, and a plate secured to the front wall of said case and providing chambers therewith in which said gear wheels are mounted.

8. A photographic camera, comprising a case, an exposure lens and its shutter casing, a rotary ring disposed on said case concentrically of said casing, said casing and ring being formed with interengaging screw-threads, a finder rockingly mounted on said case and comprising a finder lens, its carrier, and a rotary ring for shifting said finder lens and its carrier in the direction of the optical axis, a tubular member rotatably mounted on said case and connected with said ring for rotating the same, and interengaging gear teeth provided respectively on said ring disposed concentrically of said shutter casing and on said tubular member.

9. A photographic camera, comprising an exposure lens and its carrier, means for axially shifting said exposure lens and its carrier, a finder rockingly mounted on said case for preventing parallax and comprising a finder lens and a rotary member for axially shifting the same, a ring around said rotary member mounted on said case and connected with said rotary member for imparting rotary movement thereto, interengaging gear wheels connected respectively with said ring and said means for axially shifting said exposure lens, said tubular member being formed at its upper side with scale marks indicating the distance of the subject to be photographed, and a pointer on said case cooperating with said scale marks.

10. A camera case partitioned interiorly into an exposure chamber and a finder chamber, a finder pivotally mounted in the finder chamber, the case being provided with two orifices in its wall opening severally to the exposure chamber and to the finder chamber, two rings rotatably mounted in the wall of the case and severally encircling the two said orifices and means for effecting rotation of one of the rings in response to rotation of the other, a lens mounted on the wall of the case in alignment with the orifice to the exposure chamber and movable axially in its mounting in response to rotation of the said rings, a lens mounted in said finder and adjacent to the orifice to the finder chamber and movable axially in its mounting, means for effecting axial movement of the last-named lens in its mounting, in response to ring rotation, and means for effecting pivotal movement of the finder in the case in response to ring rotation.

11. A camera case partitioned interiorly into an exposure chamber and a finder chamber, a finder pivotally mounted in the finder chamber, the case being provided with two orifices formed in its wall and opening severally to the exposure chamber and to the finder chamber, a ring rotatably mounted in the wall of the case and encircling the orifice to the exposure chamber, a ring with a cam face at its inner end encircling the orifice to the finder chamber, the two said rings being provided with means for effecting rotation of one in response to rotation of the other, a lens mounted on the wall of the case in alignment with the orifice to the exposure chamber and movable axially in its mounting in response to ring rotation, a lens mounted in said finder and adjacent to the orifice to the finder chamber and movable axially in its mounting, means for effecting axial movement of the last-named lens in its mounting in the finder in response to ring rotation, the said finder engaging the cam face upon the ring encircling the orifice in the finder chamber and whereby the said finder swings in its pivotal mounting in response to ring rotation.

12. A camera case partitioned interiorly into an exposure chamber and a finder chamber, a finder pivotally mounted in the finder chamber, the case being provided with two orifices formed in its wall and opening severally to the exposure chamber and to the finder chamber, two intergeared rings rotatably mounted in the wall of the case and severally encircling the two said orifices, a picture-taking lens mounted on the wall of the case in alignment with the orifice in the exposure chamber and movable axially in its mounting in response to ring rotation, a lens structure including an axially adjustable screw-threaded lens barrel borne by said finder and protruding through the orifice to the finder chamber, the ring that encircles the opening to the finder chamber and the lens barrel of the said structure borne by the finder being equipped with slot-and-pin connection, whereby ring rotation, effecting axial movement of the picture-taking lens, effects simultaneous axial movement of the finder lens, and means for effecting pivotal movement of the finder in the case in response to ring rotation.

13. A camera case partitioned interiorly into a superior finder chamber and an inferior exposure chamber, the top wall of the case being open, a finder pivotally mounted in the finder chamber and exposed for service through the said opening in the case, the case being further provided in its front wall with two orifices opening severally to the exposure chamber and to the finder chamber, two rings rotatably mounted in the wall of the case and severally encircling the two said orifices, and means for effecting rotation of one of the rings in response to rotation of the other, a lens mounted in the wall of the case in alignment with the orifice to the exposure chamber and movable axially in its mounting in response to ring rotation, a lens mounted in said finder and adjacent to the orifice to the finder chamber and movable axially in its mounting, means for effecting axial movement of the last-named lens in its mounting in response to ring rotation, and means for effecting pivotal movement of the finder in the case in response to ring rotation.

ÁRPÁD BARÉNYI.